United States Patent [19]
Cheng

[11] Patent Number: 5,642,155
[45] Date of Patent: Jun. 24, 1997

[54] METHOD AND APPARATUS FOR SUPPORTING TWO-WAY TELECOMMUNICATIONS ON CATV NETWORKS

[76] Inventor: Alexander L. Cheng, 11 Springdale Ave., White Plains, N.Y. 10604

[21] Appl. No.: 306,204

[22] Filed: Sep. 14, 1994

[51] Int. Cl.$^6$ .................................................. H04N 7/14
[52] U.S. Cl. ..................... 348/12; 348/7; 348/13; 348/14
[58] Field of Search ................... 348/7, 10, 11, 348/12, 13, 16, 17; 455/3.1, 5.1; H04N 7/14

[56] References Cited

U.S. PATENT DOCUMENTS

| | | | |
|---|---|---|---|
| 4,574,305 | 3/1986 | Campbell et al. | 348/12 |
| 4,677,686 | 6/1987 | Hustig et al. | 455/5.1 |
| 4,928,272 | 5/1990 | Ohue | 348/12 X |
| 5,093,718 | 3/1992 | Hoarty et al. | 348/12 X |
| 5,225,902 | 7/1993 | McMullan, Jr. | 455/5.1 |
| 5,412,720 | 5/1995 | Hoarty | 348/12 X |

OTHER PUBLICATIONS

"Computer Networking on Cable TV Plants", Karshmer et al., IEEE Network, Nov. 1992.
"Combining Apples and Oranges", Pinkham, Telephony, Jan. 24, Feb. 7, Feb. 21, and Mar. 7, 1994.
"Hybridizing the Local Loop", Brunet, IEEE Spectrum, Jun. 1994.

*Primary Examiner*—John K. Peng
*Assistant Examiner*—John W. Miller

[57] ABSTRACT

A method and apparatus is disclosed for two-way multi-media communications over two-way capable cable-TV networks. The cable-TV system is divided into small community hubs, each called a Multiple Service Hub (MSH), comprising a central controller, a plurality of subscriber units and interconnecting devices. The two-way telecommunication signals of the same information type are modulated in the same frequency band compatible with the sub-split cable-TV system; e.g., telephony signals are modulated in the 5 to 30 MHz band. In each MSH the frequency bands allocated for two-way multi-media communications are re-used. Three configurations are illustrated for two-way multi-media communications. In the simplest form the MSH covers one trunk of the cable-TV network. In a more complex arrangement, several branches of the cable-TV network are combined into an MSH. In the third configuration, a central controller is co-located with the information source, e.g., the switching office of the telephone network, and the communication signals of that information type are remoted to the MSH. A signal combiner is disclosed for implementing these configurations to realize the flexibility and extensibility afforded by the present invention.

14 Claims, 4 Drawing Sheets

METHOD AND APPARATUS FOR SUPPORTING TWO-WAY TELECOMMUNICATIONS ON CATV NETWORKS

FIELD OF THE INVENTION

The present invention pertains generally to equipment on cable-TV network, and more specifically to a method and apparatus for supporting two-way multi-media communications on coaxial cable-TV (CATV) networks.

BACKGROUND OF THE INVENTION

Traditional CATV networks are designed to support one-way broadcast service using broadband coaxial cable in a tree-and-branch configuration. TV signals emanating from the headend at the root of the tree are broadcasted to the subscribers scattered at the extremities of the network. Taps and splitters are used to connect the branches while one-way amplifiers are spaced to compensate for signal attenuation. There are instances where two-way communications are considered, e.g., to gather customer viewing statistics or to support pay-per-view with remote addressability. Nevertheless, most CATV networks provide only one-way broadcast service.

The broadband potential of CATV coaxial cable plant coupled with the pervasive CATV networks is increasingly gaining recognition as one of the most cost effective architectural platform for providing interactive multi-media services. In addition to introducing new devices both at the subscriber end and at the central location, the CATV network has to be upgraded to allow two-way information flow in order to realize the broadband potential of the CATV network. The subscriber unit is for customers' access to multiple services. The central controller usually located at the headend coordinates the subscribers for two-way services. Both the subscriber unit and the central controller need to perform signalling, channel selection, modulating/demodulating among other functions. At the very least, the connectors used in the traditional CATV network, i.e., splitters and taps, have to be converted to the modem kind to allow signals traverse in both directions resulting in so called "two-way capable" network. Most proposals even require converting the one-way signal amplifiers to be two-way with the resulting network commonly called "two-way ready". Upgrading the traditional CATV networks not only requires significant investment but also demands careful engineering and ongoing maintenance effort.

Over the common transmission media, traffics traversed in different directions are carded in separate frequency bands. In the most common sub-split arrangement, the 5–30 MHz frequency band lower than the rest TV channel has been set aside for low rate data communication in the upstream direction (from the subscribers) while the downstream signals (to the subscribers) are carded in a number of TV channels in the 50–550 MHz range. This frequency allocation scheme on the broadband media not only occupies a number of CATV programming channels but also requires upgrading the traditional CATV networks. Other arrangements to split the frequency bands at a higher frequency partition (mid-split or high-split systems) require an additional device at the customer premise for frequency conversion in order to view TV programs on regular TV sets.

A serious shortcoming of most of the current approaches to two-way communication over CATV networks results from their designs to transport the two-way signals all the way back to the headend. Due to stringent bandwidth requirement of multi-media applications, the available bandwidth based on the sub-split frequency allocation scheme can only support a small number of subscribers. For example, using the similar modulation scheme as the cordless telephones, each channel requires 25 KHz to support the telephone service. Therefore, the 5–30 MHz band set aside for the upstream traffic can only accommodate up to 1000 telephone connections for the entire network. Other problems, such as noise and propagation delay, make this arrangement especially limited and costly.

For communication in the upstream direction, CATV network in essence is a multiple access media. While the current approaches use time division multiple access (TDMA) scheme to resolve the multiple access from subscribers, most of them function as time division multiplexing (TDM) without concentration instead of taking advantage of the intrinsic capability afforded by the multiple access scheme. Frequency division multiple access (FDMA) is a mature technology and yields a number of advantages over TDMA when applied in this environment.

The advances in fiber optics technology has stimulated its increasing deployment in the telecommunication industry. The current fiber optics technology in the subscriber loop section, called fiber-in-the-loop (FITL) or fiber-to-the-curb (FTTC), places an optical node serving typically fewer than ten subscribers. The drop section from the optical node to the customer premise still uses twisted pair cables. As a result, the cost is quite high for a handful of users to share the seemingly unlimited bandwidth of a optical fiber while a dedicated transmission means acting as the bottleneck of the whole distribution plant is still used to each subscriber.

On the other hand, the current trend in the CATV industry to use the optical fiber in a star topology for the CATV networks, called fiber star, improves the situation with noise and maintenance problems for serving up to tens of thousands of households at each fiber hub. To support the new two-way multi-media communication, there is a need to reduce the cost and to lay a sound foundation for growth. The CATV coaxial plant of the hybrid fiber/coax (HFC) is important for sharing the cost associated with the fiber optics equipment and for providing direct access of the broadband media to each of the subscriber, and in the mean time provides an extensible architecture for future growth.

The present invention overcomes the aforementioned limitations with the following objects:
Compatibility with two-way capable CATV network;
Flexible and extensible system architecture;
Low cost equipment and ease of engineering; and
Incremental cost as system grows.

Further objects and advantages of the present invention will become apparent from a consideration of the drawings and ensuing description thereof.

DISCUSSION OF PRIOR ART

The article, "Computer Networking on Cable TV Plants" by Arthur I. Karshmer and James N. Thomas in the 1992 November issue of IEEE Network, and U.S. Pat. No. 5,225,902 provide overviews of the background of and potential problems with two-way CATV networks. The articles, "Combining Apples and Oranges" by Rick Pinkham in 1994 January 24, February 7, February 21, March 7 issues of Telephony, and "Hybridizing the Local Loop" by Craig J. Brunet in 1994 June issue of IEEE Spectrum, provide overviews of current approaches to two-way telecommunication services on CATV networks.

U.S. Pat. No. 4,677,686 proposes a scheme for support of low rate data communication using the low band of the "two-way capable" CATV network without amplification. This patent describes a method of supporting only two-way low rate data communication over CATV network by modifying existing one-way amplifiers so that data communication signals can be transmitted in separate channels of the low frequency band of 5–30 MHz. The data communication signals from customer equipment are sent all the way to the equipment at the headend.

SUMMARY OF THE INVENTION

The present invention discloses a method and apparatus compatible with two-way capable CATV networks for two-way multi-media communications. The idea is to let CATV networks (in the most rudimentary form-Community Antenna TV) continue to serve the one-way broadcast function, and to drive the converging point for new two-way multi-media services deeper into the CATV networks using only passive sections of a CATV network at its full potential.

The present invention separates CATV networks into small community hubs, called Multiple Services Hub (MSH), with a central controller at the head of each MSH and remote terminals at each of the customers' locations. Positioned in the downstream location of all active components, the MSH allows two-way information flow within passive sections of a CATV network. This MSH arrangement re-uses the allocated frequency bands. As is well known in the art that each MSH can be sub-divided to increase usable bandwidth when the demand exceeds what can be supported in a MSH, thereby allowing a flexible and extensible arrangement compatible with two-way capable CATV networks for two-way multi-media communications.

In the preferred embodiment, the two-way signals are modulated in the same band, e.g., telephony signals use lower band (5–30 MHz). This frequency arrangement provides two major benefits: 1) to enable low cost equipment with symmetrical design and 2) to afford flexibility to extend the signals to remote locations. Leveraging on mature FDMA technologies, the present invention enables a flexible system architecture and a cost-effective evolution path for system growth. With the present invention there is no need to construct and to maintain a two-way ready CATV network while constrained by the capacity limitation of such network. The multiple access scheme provides concentration inherently while internal switching and dynamic bandwidth-on-demand can be easily incorporated. Three possible configurations are illustrated for supporting two-way multi-media communications over CATV networks. In the simplest form the MSH covers one trunk of the CATV network. In a more complex arrangement, several branches of the CATV tree are combined into a MSH. In the third configuration, a central controller is co-located with the information source, e.g., switching office of the telephone network. A coaxial cable carrying only the two-way traffic is extended to the remote signal combiner to be combined with the one-way broadcast CATV signal for transporting downstream to each of the subscribers.

Therefore, the benefits of the present invention are:
No need to construct two-way ready CATV networks;
Cost sharing and assess of the broadband media;
Extensibility for support of new services and increased demand;
Incremental cost for system growth; and
Improved reliability for not relying on two-way amplifiers.

DETAILED DESCRIPTION OF THE PREFERRED EMBODIMENT

The present invention discloses a method and apparatus compatible with two-way capable CATV networks for two-way multi-media communications. Telephone service will be used as an example of two-way multi-media communications for describing the present invention hereafter.

Figure 1:
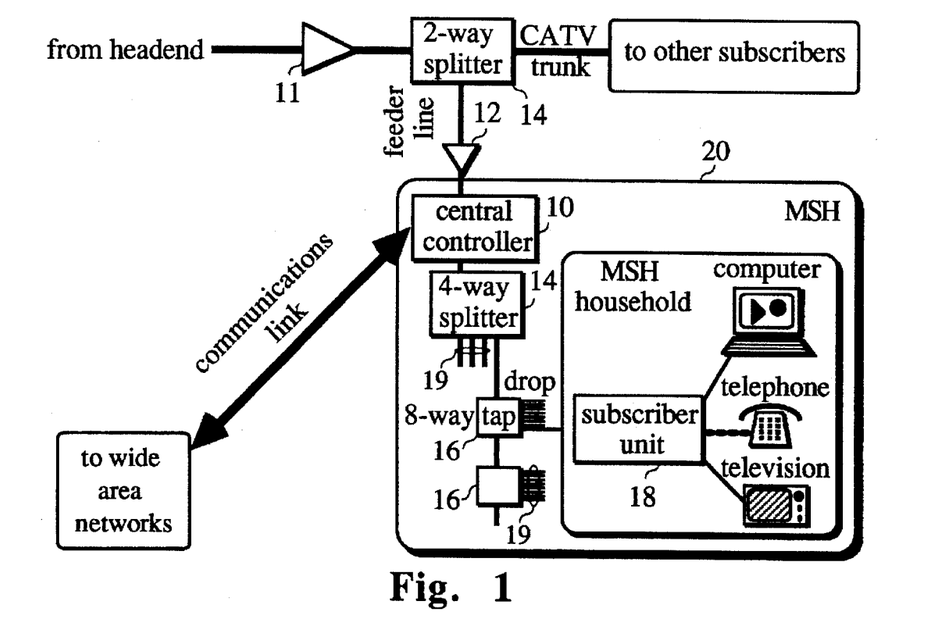
FIG. 1 depicts the system architecture of Multiple Services Hub (MSH) comprising a central controller, a plurality of subscriber units and interconnecting devices.

FIG. 1 depicts the system architecture of a Multiple Services Hub (MSH) 20 in a CATV network in one possible configuration. The central controller 10 is placed at the downstream location of the feeder line amplifier 12 and signifies the upper boundary of a MSH at which point the two-way information enters and exits the CATV network. The existing cable plant with splitters 14 and taps 16 connect the central controller 10 to all subscriber units 18 within this MSH. The subscriber unit 18 located at the customer premise provides access to multiple services, such as telephony, CATV programming, and other interactive multi-media communication services.

To illustrate compatibility of applicant's invention with existing cable-TV networks, the following engineering calculations corresponding to a cable-TV network for a high-rise apartment building shows how to satisfy the signal strength requirements for two-way multimedia communications. Similar calculations must be carded out for all network upgrades or reconfiguration.

First the following shows how to meet the required 64 dB signal strength for TV at the customers' premises. The signal attenuation through a typical splitter is less than 5 dB, while the signal attenuation through a typical coaxial cable is less than 15 dB per 100 meters for 550 MHz signals. Assuming that the output power of the line extender (12 in FIG. 1) is 100 dB, the distance between the last amplifier 12 and the 4-way splitter 14 is three meters, the signal attenuation through central controller 10 is 5 dB similar to a splitter, the distance between the 4-way splitter 14 and the first 8-way tap 16 is 30 meters, the distance between the first 8-way tap 16 and the second 8-way tap 16 is 10 meters, all drop cables 19 to the customers' premises are 20 meters in length, it suggests using an 8-way tap with $100-5-5-(15\times(3+30+20)/100)-64=18$ dB tap loss for the first 8-way tap 16. The signal attenuation of this type of 8-way taps is less than 3 dB. Therefore, it suggests using an 8-way tap with $100-5-5-3-(15\times(3+30+10+20)/100)-64\approx13.5$ dB tap loss for the second 8-way tap 16.

Attenuation through typical two-way capable CATV networks is much lower for signals of lower frequency than the 550 MHz signal used in the calculations above. Attenuation for the upstream direction normally exhibits the same characteristics as the downstream direction. Therefore the MSH shown in FIG. 1 is able to support two-way multi-media communications without signal amplification.

Figure 2:
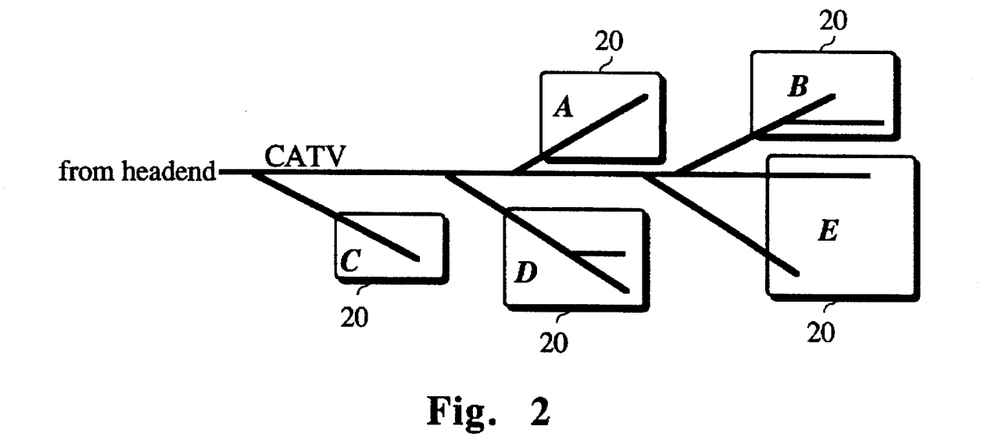
FIG. 2 illustrates possible arrangements of MSHs overlaying the passive sections of a CATV network.

FIG. 2 illustrates how a CATV network is carved into many MSHs. Some of the MSHs, e.g., A, B, C and D, cover a distinct branch of the CATV network while others, e.g., E, may have coverage of multiple branches. In each of the MSH, the frequency bands allocated for two-way communications are re-used. This is similar to the "cell" concept in cellular radio-telephone technology with fixed boundary (signals traversed on cable instead of over the air). Any branch of CATV network can belong to only one MSH, i.e., there is no overlap between MSHs as in cellular radio-telephony. The sizes and locations of MSHs depend on design of the CATV plant and the geographical distribution of served households.

This architecture allows flexible arrangements of MSHs wherein a trade-off has to be made between the investment to upgrade the network for two-way communications and the cost saving with greater coverage of subscribers to justify the initial installation. The higher up the CATV tree (closer to the headend), the more households can be covered by the MSH. The greater coverage of a MSH results in cost sharing for two-way multi-media services deployment while incurring cost for upgrading and maintaining the two-way network. A number of the passive sections of a CATV network can be combined in a single MSH as described in detail later.

Figure 3:
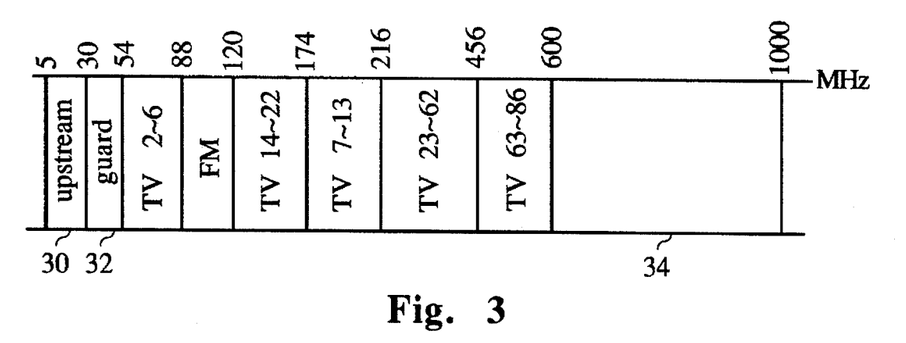
FIG. 3 diagrams CATV frequency spectrum allocation with frequency bands allocated for narrow-band services and other multi-media services specifically labeled.

The available bandwidth of CATV coaxial cables is rated at 1 GHz. The frequency allocation of the CATV network is diagramed in FIG. 3. The 5-30 MHz frequency band 30 lower than the TV channels has been traditionally reserved for the upstream traffic (from subscribers' units to the headend). A guard band 32 between 30 MHz to the first TV channel (channel 2) is set aside to separate the signals traversing in the downstream and upstream directions. Analog TV programming (VHF and UHF) and FM radio signals are broadcasted from 54 MHz and up. The preferred embodiment modulates the signals for upstream and downstream directions in separate channels in the same frequency bands. In case of telephone service, the two-way information is to be modulated in the 5-30 MHz band 30. Other type of traffic will be carded in an appropriate higher band 34 where required bandwidth can be allocated without interfering with other services. The signal attenuation with same characteristics for both directions allows easier and less costly engineering effort.

The present invention can be implemented using the central controller and the remote terminals as subscriber units disclosed in the U.S. Pat. No. 5,563,883 (patent application Ser. No. 08/276,534 filed on Jul. 18, 1994). The disclosure of said application hereby is being incorporated by reference.

Using communication protocol in the above patent disclosure, multiple accesses from subscribers are resolved in a novel FDMA scheme over two-way capable CATV networks. The advantage of FDMA scheme over TDMA are
Incremental cost for new subscribers—the initial system installation can be configured with minimum number of channels and expanded as the need arises;
Redundancy—the communication channels serve as backup for one another through the coordination of the FDMA signalling protocol;
Asynchronous signalling protocol—since there is no need for synchronization, the protocol can be greatly simplified resulting in an inexpensive implementation.
Symmetrical design—since the transmitter and receiver of each device share the same frequency band, thereby resulting in a re-usable design In addition to the advantages stated above, the following features are readily available using the FDMA protocol.

Concentration is a direct result of contention of the multiple access media, i.e., the multiple access communication system can inherently support more users than the available channels with better utilization of the transmission media. Depending on the service type and the usage, the concentration ratio varies. For telephony services the concentration ration is typically between 5 and 10, therefore, one communication channel to the wide area network is needed for every 5 to 10 subscribers. Circuit switching within the same MSH is accomplished by the central controller performing frequency conversion between two subscribers engaged in the communication. Data communication can be supported either using the established circuit and/or using LAN-like technology. The LAN is effected by modulating two separate frequency bands for each direction by the central controller. That is, the central controller needs to perform the frequency conversion from the upstream channel to the downstream channel with protocol modifications as covered in the article, "Computer Networking on Cable TV Plants" by Arthur I. Karshmer and James N. Thomas in the 1992 November issue of IEEE Network. Broadcast and multicast services are supported by addressing the communication signals to multiple subscriber units in the same MSH. It is possible to dynamically allocate multiple channels at connection establishment phase of the signalling protocol. This feature is useful to support communication with various bandwidth requirement (bandwidth-on-demand). This is an extension to the ISDN concept with a number of bearer (B) channels to be allocated dynamically to each subscriber using a common signalling data (D) channel.

Video signals are classified into analog and digital forms. The analog video signal is equivalent to the signal that conventional TV sets receive. Transmission of analog video signals downstream from the headend to subscribers is standard practice on all cable TV networks. It is well known in the art that transmission of analog video signals upstream from subscribers to the headend requires a separate frequency band without interference from/to other signals. So it should be noted that there is no limitation on the two-way transmission of analog video signals in the disclosed system.

Transmission of digital video signals downstream and/or upstream is similar to data communication with more stringent delay requirements. As is well known in the art that the amount of data to be transmitted depends on the employed compression scheme as well as the desired quality. So it should be noted that there is no limitation on two-way transmission of digital video signal in the disclosed system.

Figure 4:
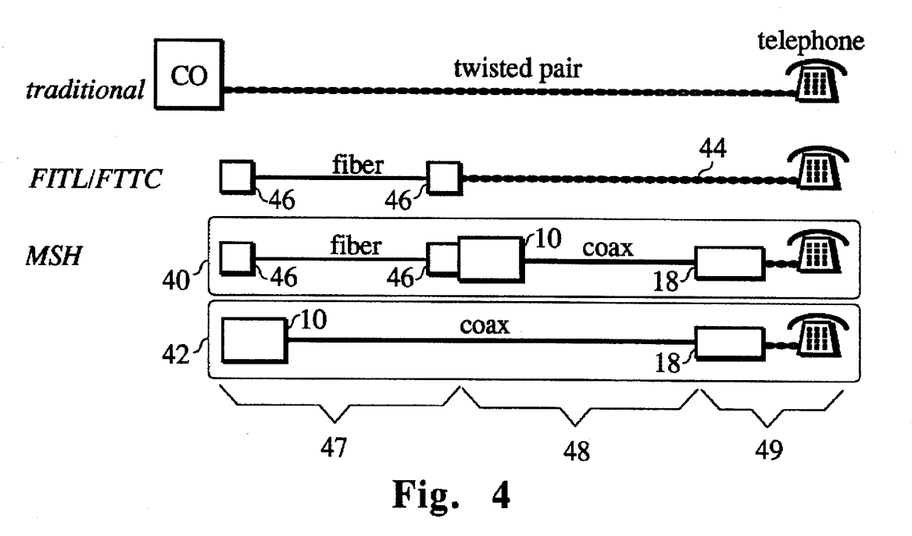
FIG. 4 shows the MSH in relationship to the conventional telephone loop construction methods.

In terms of telephone subscriber loop construction, the relationship of MSH to the traditional twisted pair, fiber-in-the-loop (FITL) and fiber-to-the-curb (FTTC), is depicted in FIG. 4. The subscriber loop is customarily separated into feeder section 47, drop section 48, and customer premise 49. Two cases corresponding to the possible configurations are described in FIG. 4. The first case 40 serves as replacement for the drop section and part of the feeder section, while the second one 42 replaces the complete subscriber loop. Comparing to the FTTC technology which uses twisted pair cable 44 for the drop section even though optical fiber is used to connect to the central office (CO) with fiber terminal equipment 46, the MSH can complement the optical fiber distribution for bringing flexible broadband access to each household.

Figure 5:
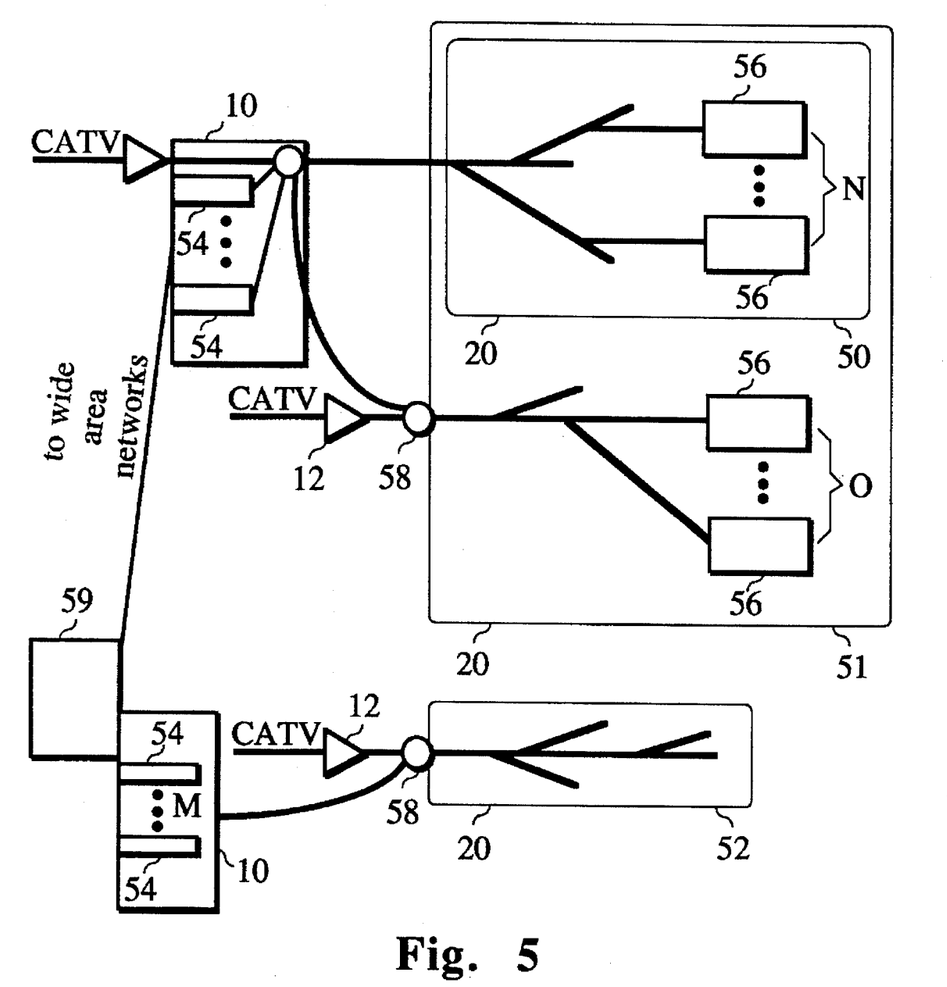
FIG. 5 illustrates three possible configurations using MSH architecture.

FIG. 5 depicts three possible configurations with MSHs, each is expected to be in the neighborhood of 500. In the first configuration 50, the central controller 10 is at the head of a CATV branch with M number of communication channels 54 serving up to N number of subscribers downstream. In the second configuration 51, a remote branch of a CATV network supporting O number of subscribers is connected by using coax trunking to the signal combiner 58 resulting in a MSH spanning over two disjoint branches supporting total N+O number of subscribers. In the third configuration 52, the central controller is co-located with the information source 59, e.g., the Central Office (CO) in case of telephony, and coax trunking scheme is used to reach the MSH. Note that all MSHs 20 start at a downstream location of the last feeder line extender (amplifier) 12. The one-way amplifier actually helps by serving as blocking device for the two-way traffic from propagating upstream. It is possible to move the MSH higher up in the network at a upstream location of an amplifier. However, the amplifier has to pass the two-way signals. It is therefore an engineering trade-off of subscriber coverage and effort to upgrade the amplifiers to two-way.

Figure 6:
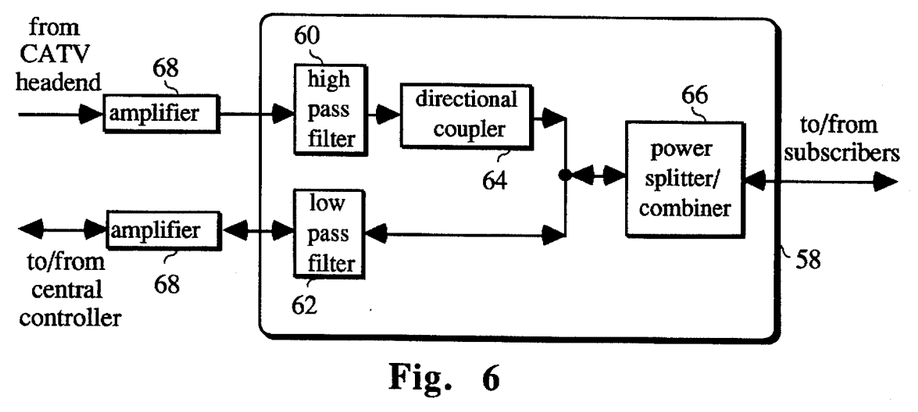
FIG. 6 is the block diagram of the signal combiner.

The block diagram of a signal combiner for telephone service is illustrated in FIG. 6. The high-pass filter 60 is to separate the CATV one-way broadcast signal (customarily 50–750 MHz) while the low-pass filter 62 is used to separate the two-way telephony signals (5–40 MHz). These filters need to be changed to band-pass type for other services using higher frequency bands. A directional coupler 64 is used to prevent the two-way signal from propagating upstream to interfere with existing CATV services. The CATV one-way broadcast signal is then combined with the two-way multi-media signal in the two-way power splitter/combiner 66 before feeding to the CATV cable plant downstream to the subscribers. This signal combiner is a passive device unless amplification is desired (using the amplifiers 68). The insertion loss from either CATV broadcast signal or the two-way telephone signal can approach the theoretical optimal of 3 dB while the isolation between the CATV and telephone signals is engineered to exceed 20 dB. The directivity of the directional coupler is to exceed 40 dB. Based on the signal attenuation characteristics of the coaxial cable (roughly 1 dB attenuation per 100 feet for 30 MHz signal), it is possible to extend the distance of 1 km. with 30 dB signal strength budget before the signal has to be amplified.

Figure 7:
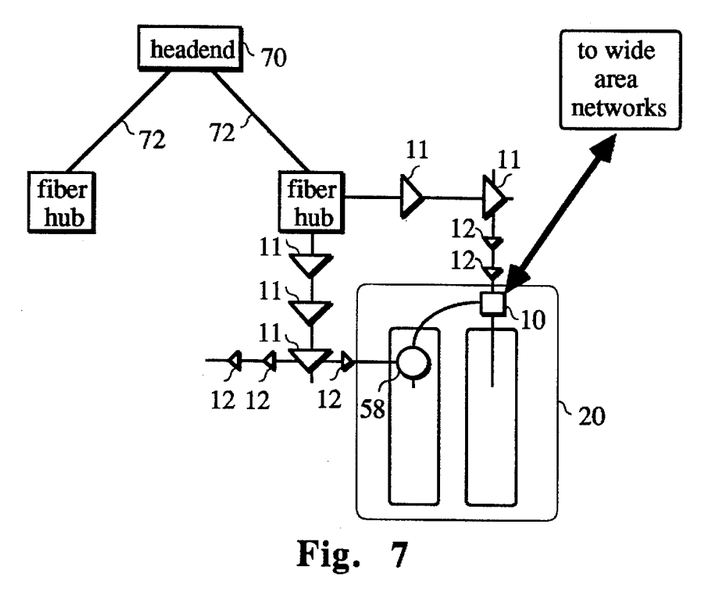
FIG. 7 is an example of MSH in a CATV Network with fiber star topology.

In FIG. 7, a MSH spanning two separate branches of a CATV network with fiber-star topology is depicted. Optical fibers 72 are used to transport the CATV programming signals to fiber hubs from the headend 70. At each fiber hub, the CATV signals are converted to electrical signals to be transported to the subscribers via coax network using splitters, taps, trunk line amplifiers 11 and feeder line amplifiers 12. An MSH is configured using the coax nunking scheme where the central controller 10 is connected to a separate branch of the coax network using signal combiner 58. FIG. 7 demonstrates that the flexibility of the MSH in CATV networks using fiber star topology.

It is evident from the above for those skilled in the art that the present invention enables a flexible, extensible and cost effective scheme that is compatible with two-way capable CATV networks for support of two-way multi-media communications.

Furthermore, the following features can be readily incorporated in the architecture. Local services, such as Karaoke or other information sources, can be introduced at the central controller. Other network services can also be incorporated. For example, the MSH central controller can serve as the last cache for video-on-demand service. If the traffic volume between MSHs reaches the point where interconnect is justified, MSH-to-MSH interconnect can also be provided for all the services required.

From the foregoing, it will be observed that numerous variations and modifications may be effected without departing from the true spirit and scope of the novel concept of the invention. It should be understood that no limitation with respect to the specific structure and circuit arrangements illustrated is intended or should be inferred. It is, of course, intended to cover by the appended claims all such modifications as fall within the scope of the claims.

Thus, in accordance with the invention, a Method And Apparatus for Supporting Two-way Multi-Media Communications on CATV Networks has been provided accomplishing all of the objects, and having the features and advantages specified at the beginning of this specification. It is to be understood that the disclosed construction of the invention may be embodied in other forms within the scope of the claims.

What is claimed is:

1. In a two-way capable cable-TV system having a headend and a plurality of subscriber units connected by splitters and taps to a shared transmission means, a method of two-way multi-media communications of data, audio and video comprising the steps of:

(a) allocating separate frequency bands for modulated two-way signals of each of a plurality of information types of two-way multi-media communications;

(b) dividing the cable-TV system into a plurality of serving hubs each covering a passive section of said cable-TV system;

(c) re-using said allocated frequency bands for two-way multi-media communications for each of said plurality of information types in each of said plurality of serving hubs; and (d) providing a converging point at the head of each of said plurality of serving hubs remote from said headend for each different information type which connects to a wide area network of that information type.

2. In the cable-TV system for two-way multi-media communications of daB, audio and video of claim 1 said allocating separate frequency bands comprising the steps of:

(a) determining the required bandwidth for each transmission direction for each information type;

(b) designating a frequency band for each of said plurality of information types; and (c) modulating traffic for each transmission direction of each information type in separate channels of the same frequency band.

3. In the cable-TV system for two-way multi-media communications of data, audio and video of claim 1, said dividing the cable-TV system into a plurality of serving hubs comprising the steps of:

(a) mapping said passive sections of the cable-TV system;

(b) surveying the number and distribution of subscribers in the cable-TV system;

(c) calculating the required bandwidth for said two-way multi-media communications by the subscribers in each of said plurality of serving hubs, whereby one of said serving hubs has a different traffic requirement in an information type from another serving hub;

(d) determining the coverage of each of said plurality of serving hubs; and (e) configuring each of said plurality of serving hubs remote from said headend.

4. In the cable-TV system for two-way multi-media communications of data, audio and video of claim 3, said configuring each of said plurality of serving hubs comprising the step of placing a central controller remote from said headend at the head of one of the serving hubs covering a distinct branch of the cable-TV system for two-way multi-media communications of said plurality of information types.

5. In the cable-TV system for two-way multi-media communications of data, audio and video of claim 3, said configuring each of said plurality of serving hubs comprising the steps of:
   (a) placing a central controller remote from said headend at the head of one of the serving hubs coveting a distinct branch of the cable-TV system;
   (b) placing a signal combiner remote from said headend at the head of another and separate branch of the cable-TV system; and
   (c) connecting said central controller with said signal combiner using a dedicated coaxial cable for transporting signals of said two-way multi-media communications.

6. In the cable-TV system for two-way multi-media communications of data, audio and video of claim 3, said configuring each of said plurality of serving hubs comprising the steps of:
   (a) co-locating a central controller with an information type source;
   (b) placing a signal combiner remote from said headend at the head of a branch of the cable-TV system for combining communications signals of different information types; and
   (c) connecting said central controller with said signal combiner using a dedicated coaxial cable for extending communication signals from said information type source to said branch of the cable-TV system.

7. In the cable-TV system for two-way multi-media communications of data, audio and video of claim 1, said dividing the cable-TV system into a plurality of serving hubs comprising the steps of:
   (a) mapping said passive sections of the cable-TV systems;
   (b) surveying the number and distribution of subscribers in the cable-TV system;
   (c) calculating the required bandwidth for said two-way multi-media communications by the subscribers in each of said plurality of serving hubs, whereby one of said serving hubs has a different information type from another serving hub;
   (d) determining the coverage of each of said plurality of serving hubs; and
   (e) configuring each of said plurality of serving hubs.

8. In the cable-TV system for two-way multi-media communications of data, audio and video of claim 7, said configuring each of said plurality of serving hubs comprising the step of placing a central controller remote from said headend at the head of one of the serving hubs covering a distinct branch of the cable-TV system for two-way multi-media communications of said plurality of information types.

9. In the cable-TV system for two-way multi-media communications of data, audio and video of claim 7, said configuring each of said plurality of serving hubs comprising the steps of:
   (a) placing a central controller remote from said headend at the head of one of the serving hubs covering a distinct branch of the cable-TV system;
   (b) placing a signal combiner remote from said headend at the head of another and separate branch of the cable-TV system; and
   (c) connecting said central controller with said signal combiner using a dedicated coaxial cable for transporting signals of said two-way multi-media communications.

10. In the cable-TV system for two-way multi-media communications of data, audio and video of claim 7, said configuring each of said plurality of serving hubs comprising the steps of:
    (a) co-locating a central controller with an information type source;
    (b) placing a signal combiner remote from said headend at the head of a branch of the cable-TV system for combining communications signals of different information types; and
    (c) connecting said central controller with said signal combiner using a dedicated coaxial cable for extending communication signals from said information type source to said branch of the cable-TV system.

11. In a cable-TV system having a headend and a plurality of subscriber units connected by splitters and taps to a shared transmission means, a signal combiner for two-way multi-media communications of data, audio and video comprising:
    (a) one-way signal frequency band separating means remote from said headend for separating a frequency band of one-way cable-TV broadcast signals for transmission of said one-way cable-TV broadcast signals downstream to subscriber units;
    (b) two-way signal frequency band separating means remote from said headend for separating a frequency band of two-way multi-media communications for transmission of said two-way multi-media communications signals to and from subscriber units;
    (c) protection means remote from said headend for protecting said one-way cable-TV broadcast signals from interference by said two-way communications signals by blocking frequency band of said two-way multi-media communications signals from being transmitted to the source of cable-TV broadcast signals;
    (d) frequency bands combining means remote from said headend for combining said one-way cable-TV broadcast signals with said two-way multi-media communications signals for transmission downstream to the subscribers; and
    (e) frequency bands power splitting means remote from said headend for splitting communications signals from the subscribers to said two-way signal separating means for transmission upstream.

12. In the signal combiner for two-way multi-media communications of data, audio and video of claim 7, said one-way signal separating means is unpowered, said two-way signal separating means is unpowered, said protection means is unpowered, said frequency bands combining means is unpowered, and said frequency bands power splitting means is unpowered.

13. In a two-way capable cable-TV system having a headend and a plurality of subscriber units connected by splitters and taps to a shared transmission means, a two-way multi-media communications system of data, audio and video comprising:
    (a) means for allocating separate frequency bands for modulated two-way signals of each of a plurality of information types of two-way multi-media communications;
    (b) means for dividing the cable-TV system into a plurality of serving hubs each covering only a passive section of said cable-TV system;
    (c) means for re-using said allocated frequency bands for two-way multi-media communications for each of said plurality of information types in each of said plurality of serving hubs; and (d) means for providing a converging point remote from said headend for each different information type which connects to a wide area network of that information type.

14. In the cable-TV system for two-way multi-media communications of data, audio and video of claim 13, said means for allocating separate frequency bands further comprising:

(a) means for determining the required bandwidth for each transmission direction for each information type;

(b) means for designating a frequency band for each of the plurality of information types; and (c) means for modulating traffic for each transmission direction of each information type in separate channels of the same frequency band.

* * * * *